United States Patent [19]

Miyasita et al.

[11] 3,997,825
[45] Dec. 14, 1976

[54] METHOD AND APPARATUS FOR CONTROLLING SYNCHRONOUS MOTOR

[75] Inventors: Kunio Miyasita; Hironori Okuda, both of Hitachi; Yasuyuki Sugiura, Takahagi; Takeo Maeda, Hitachi; Yasuo Matsuda, Hitachi; Kazuo Honda, Hitachi, all of Japan

[73] Assignee: Hitachi, Ltd., Japan

[22] Filed: Oct. 7, 1974

[21] Appl. No.: 512,924

[30] Foreign Application Priority Data
Oct. 12, 1973  Japan .......................... 48-113952

[52] U.S. Cl. ............................................. 318/171
[51] Int. Cl.² ........................................ H02P 5/34
[58] Field of Search ........... 318/171, 227, 230, 231

[56] References Cited
UNITED STATES PATENTS

| | | | |
|---|---|---|---|
| 3,444,451 | 5/1969 | Schlabach et al. | 318/231 X |
| 3,619,749 | 11/1971 | Schieman | 318/231 |
| 3,718,847 | 2/1973 | Graf et al. | 318/231 X |
| 3,800,199 | 3/1974 | Weigand | 318/171 X |
| 3,819,992 | 6/1974 | Opal et al. | 318/171 |
| 3,832,611 | 8/1974 | Onoda et al. | 318/171 |

*Primary Examiner*—Gene Z. Rubinson
*Attorney, Agent, or Firm*—Craig & Antonelli

[57] ABSTRACT

In the control of a synchronous motor driven by a power converter of voltage source type, the phase of the current flowing into the motor is detected and gate signals are produced on the basis of the phase of the current, so that the output frequency of the power converter is controlled by the gate signals so as to control the motor.

9 Claims, 9 Drawing Figures

METHOD AND APPARATUS FOR CONTROLLING SYNCHRONOUS MOTOR

The present invention relates to a method of controlling a synchronous motor driven by a power converter using thyristors such as an inverter or cycloconverter and more particularly to an improvement in a method and an apparatus for controlling a so-called self-controlled electric motor.

In the driving of a synchronous motor by an inverter, the rotating speed of the synchronous motor is determined in accordance with the output frequency of the inverter. In this case, the firing of the thyristors of the inverter must be controlled in synchronism with the angular positions (phases) of the rotor of the motor and there are two methods known in this respect. One is the method of external control type in which the inverter used is controlled by the output of the oscillator separately provided so as to control the output frequency of the inverter. The other is the method of self-control type in which the angular position of the rotor of the synchronous motor driven by the inverter is directly detected so that the firing of the thyristors of the inverter is controlled to control the output frequency of the inverter.

In case where a plurality of synchronous motors are driven by a single externally controlled inverter, there is caused a problem that a hunting phenomenon may take place due to the variation of the oscillating frequency of the oscillator.

This problem can be solved by the use of a self-controlled inverter and the self-control type method is adopted where one or more electric motor is driven by an inverter.

Now, in order to compare the present invention with the prior art, the attached drawings will be briefly described below, in which.

Figure 1:
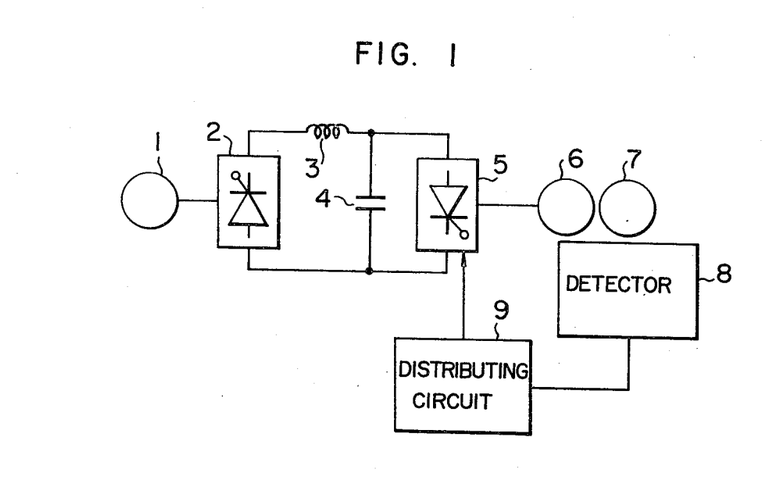
FIG. 1 shows a circuit for driving a synchronous motor, according to the conventional method of the self-control type.

In FIG. 1 showing a circuit configuration in which a synchronous motor is connected with a inverter to drive it, reference numeral 1 indicates as ac power source; 2 a rectifying circuit whose detail is not shown but which is in the form of a well-known full-wave rectifying configuration; 3 and 4 a smoothing reactor and a smoothing capacitor respectively, to smooth the ripple components in the dc output of the rectifying circuit 2; 5 an inverter which receives the dc output of the rectifier 2 and delivers an ac voltage having rectangular or stair-case waveform, the circuit of the inverter 5 being well known and not shown in the figure; 6 a stator of a synchronous motor; 7 a rotor of the synchronous motor; 8 a detector to detect the angular position of the rotor 7; and 9 a distributing circuit which receives the signal representing the angular position of the rotor 7 of the snychronous motor, detected by the detector 8 and delivers the gate signal to control the firing of the thyristors constituting the inverter 5 in a predetermined order. To the stator 6 of the synchronous motor is applied a voltage whose frequency is synchronous with that of the voltage across the rotor 7 and therefore the order of firing the thyristors of the inverter 5 can be determined by the detector 8. The amplitude of the terminal voltage applied to the stator 6 of the synchronous motor is determined depending on the amplitude of the outpt voltage of the rectifier 2 while the operating frequency of the synchronous motor is fixed depending on the output frequency of the inverter 5. Accordingly, even if the load on the synchronous motor fluctuates for some cause in its steady operation and if the rotational speed and the terminal voltage, of the motor is varied, the rectifier 2 and the inverter 5 are fast controlled in response to the variation so that the synchronous motor can continue its stabilized operation.

In the circuit structure shown in FIG. 1, however, the detector 8 to detect the angular position of the rotor 7 usually has a structure in which a rotating member is directly coupled to the rotor 7 to detect the angular position by a photoelectric tube, an electromagnetic pickup coil, or a proximity switch. Therefore, the following drawbacks are incurred. Although the detector of the above described type is expensive, it has rather a short life. Since the detector itself is directly coupled to the rotor of the synchronous motor, the space occupied by the detector adds to the size of the motor. If the motor in question is of small capacity and high speed type, not only the maintenance and adjustment of the detector is difficult but also the detection accuracy becomes poor. Moreover, in the case of parallel operation of a plurality of motors by a single inverter, the detector provided in only one of the motors is to representatively control all the motors and if the motor provided with the detector stops or fails in snychronization, the operation of all the motors becomes impossible.

It is therefore the object of the present invention, which has been made to eliminate the drawbacks mentioned above, to provide a method and an apparatus for controlling electric motors according to which the motors can be stably operated without such a detector to detect the angular position of the rotor as described above.

Figure 2:
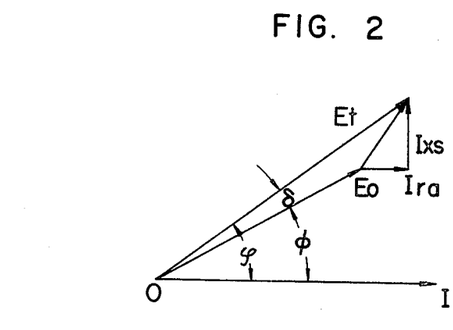
FIG. 2 is a vector diagram representing the characteristic of a synchronous motor, useful to explain the fundamental principle of the present invention.

First, the fundamental principle of the present invention will be described with reference to the vector diagram in FIG. 2. In FIG. 2, $E_t$ designates the terminal voltage, $E_o$ the induced electromotive force, I the armature current, $I_{ra}$ the resistance drop and $I_{xa}$ the reactance drop, the phase difference $\phi$ between the terminal voltage $E_t$ and the armature current I giving the power factor angle and the phase difference $\delta$ between the terminal voltage $E_t$ and the internal induced electromotive force $E_o$ defining the load angle.

According to the conventional method in which the thyristors of the inverter are controlled by the signal from the detector to detect the angular position of the rotor (hereafter referred to for brevity as a rotor position detector), the phase of the terminal voltage $E_t$ is detected by detecting the phase of the induced electromotive force $E_o$ (having a certain fixed relationship with respect to the phase of the rotor) and by controlling the load angle $\delta$.

In case of a synchronous motor, as described later, if the power factor angle $\phi$ is determined with the ratio $E_t/E_o$ varying as parameter, the load angle $\delta$ is also determined having a fixed relationship to the power factor angle. According to the present invention, therefore, the power factor angle is taken into very much acount and the gate control of the inverter can be performed without using the conventional rotor position detector, by detecting the phase of the armature current I and controlling the power factor angle $\phi$ between the armature current I and the terminal voltage $E_t$. Namely, the phase of the armature current I is detected and the gate signal for the inverter is produced on the basis of the detected signal. Since, in case of an inverter of voltage source type, the phase of the output voltage of the inverter has a fixed relationship to the phase of the gate signal for the inverter, the power factor angle $\phi$ between the current and the terminal voltage, of the motor is to be after all controlled.

Figure 3:
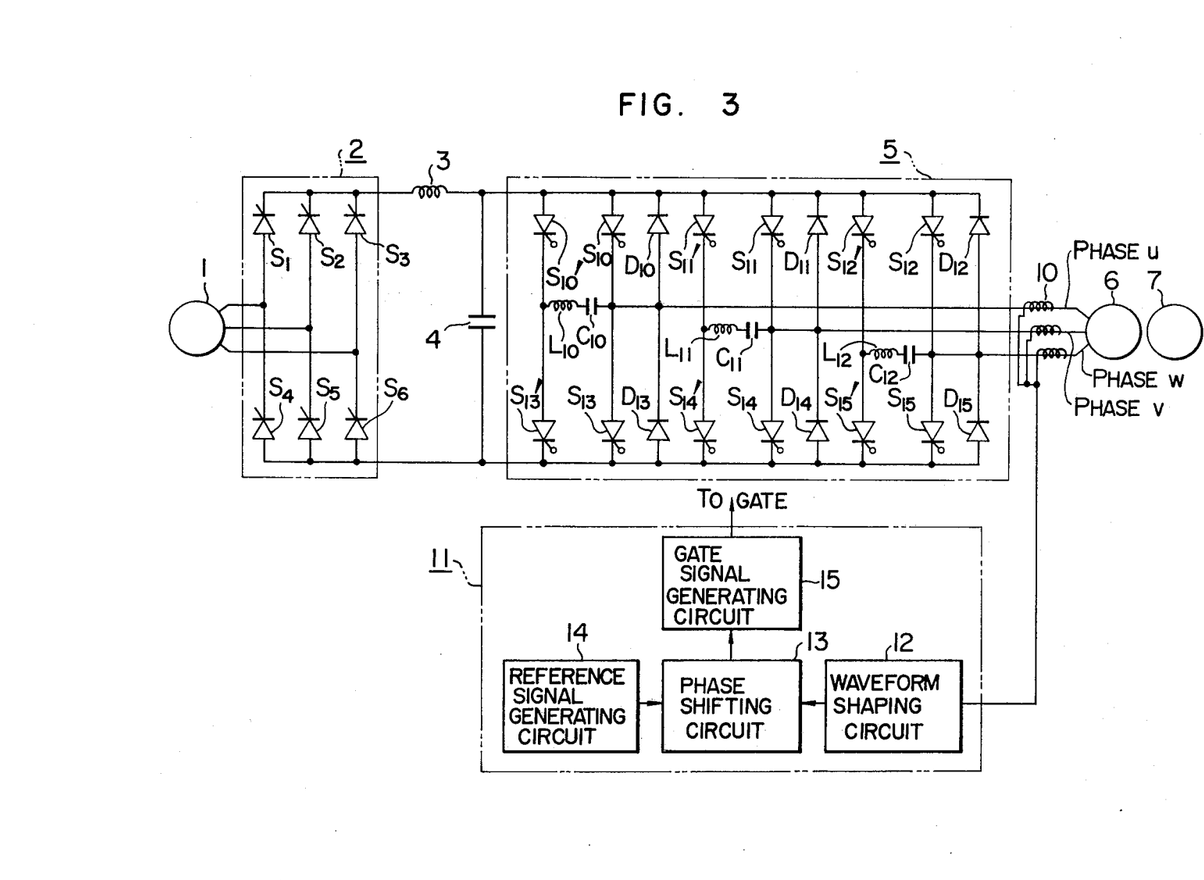
FIG. 3 shows a circuit for driving a synchronous motor, according to one embodiment of the present invention.

FIG. 3 shows one embodiment of the present invention, in which the same reference numerals are applied to like parts as in FIG. 1. In FIG. 3, a recifying circuit 2 consists of thyristors S1–S6 connected in bridge and an inverter 5 is cnstituted of main thyristors S10 –S15, auxiliary thyristors S10'–S15', feedback diodes D10 –D15, commutating reactors L10 –L12, and commutating capacitors C10 –C12. The inverter 5 is an inverter of conduction-through-1180° type in which three of the thyristors S10 –S15 always conducting and its commutating operation is too well known to be described here.

Current detector 10 is provided to replace the rotor position detector 8 shown in FIG. 1 and serve to detect the currents flowing from the inverter 5 into the stator 6 of a snychronous motor. A distributing circuit 11 consists of a waveform shaping circuit 12, a phase shifting circuit 13, a reference signal generating circuit 14 and a gate signal generating circuit 15.

Figure 4:
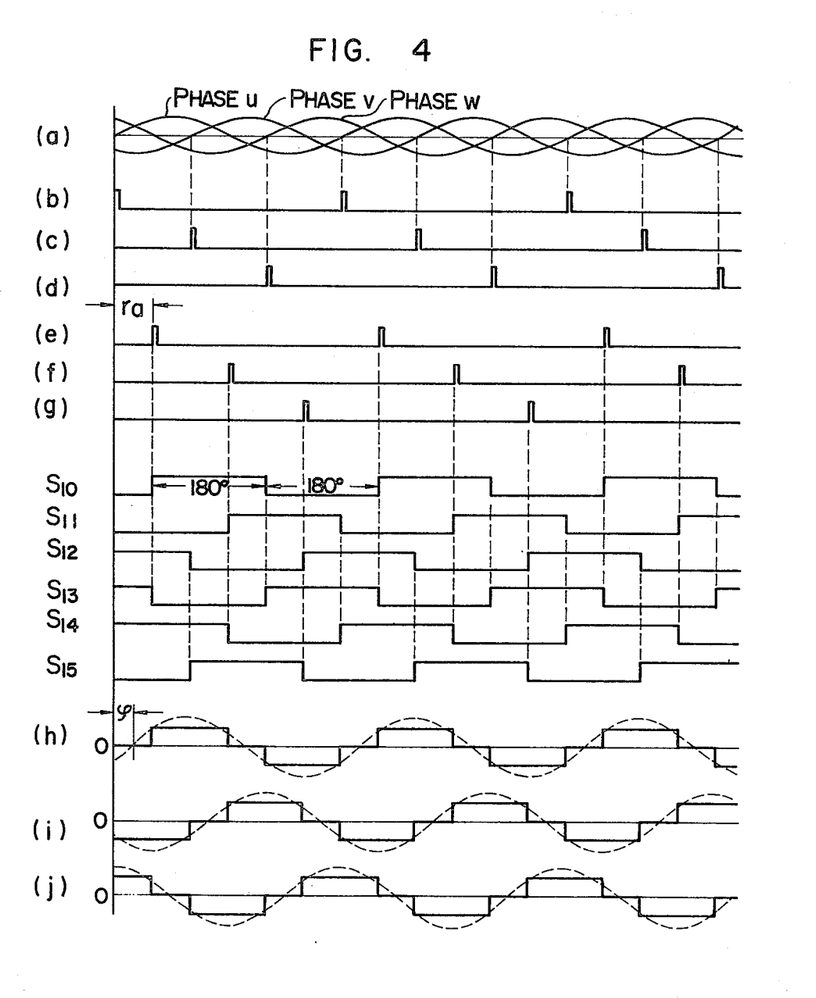
FIGS. 4 and 5 are diagrams useful to explain the operation of the circuit shown in FIG. 3.

The operation of the distributing circuit 11 will now be described with reference to FIg. 4. The armature currents of respective phases shown in the diagram (a) of FIG. 4 are detected by the current detector 10 and sent to the waveform shaping circuit 12. The waveform shaping circuit 12 delivers output pulses whenever the armature currents of the respective phases become zero (i.e. cross the zero level from negative to positive), as shown in the diagrams (a), (b), (c) and (d) of FIG. 4. For example, the waveform shaping circuit 12 first converts the armature currents having sinusoidal waveforms to the corresponding signals having rectangular waveforms and in snychronism therewith. The signals having the rectangular waveforms are then differentiated and only the positive differentiated pulses are sampled out to obtain such pulses as shown in the diagrams (b), (c) and (d) of FIG. 4. The output pulses from the waveform shaping circuit 12 are fed to the phase shifting circuit 13, which shifts the pulses from the circuit 12 by $\gamma a$ according to the output of the reference signal generating circuit 14, as shown in the diagrams (e), (f) and (g) of FIG. 4. Accordingly, the gate signal generating circuit 15 generates the gate signals for the thyristors S10 –S15, on the basis of the output pulses from the phase shifting circuit 13, as shown in FIG. 4. The gate signals are provided with the same reference characters as applied to the associated thyristors. Since the firing of the thyristors of the inverter 5 is controlled by the gate signals, the outputs of the inverter 5 have staircase waveforms: the output voltage between the phases u and v is shown in the diagram (h) of FIG. 4, the output voltage between the phases v and w in the diagram (i), and the output voltage between the phases w and u in the diagram (j). In this case, the fundamental waveforms of the staircase voltage signals are sinusoidal, as indicated by broken curves. Thus, the power factor angle $\phi$ is determined by determining the shift angle $\gamma a$.

Figure 5:
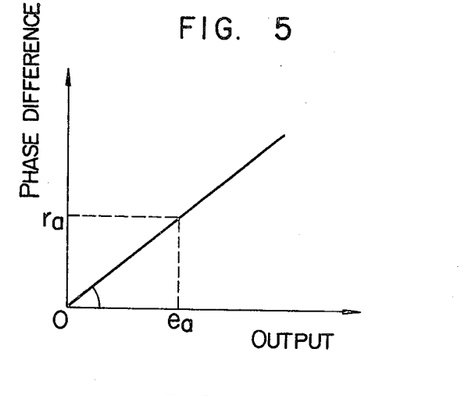

Therefore, since the phase of the output voltage of the inverter 5 is determined by shifting the phase of the armature current detected by the current detector 10, through the phase shifting circuit 13 by a constant phase difference $\gamma a$ in accordance with the output $e_a$ of the reference signal generating circuit 14, the firing of the thyristors of the inverter 5 can be controlled, without any rotor position detector necessary for the conventional system, by detecting the phase of the armature current and controlling the power factor angle $\phi$. In FIG. 5 is shown the relationship between the output $e_a$ of the reference signal generating circuit 14 and the phase difference between the output of the phase shifting circuit 13 and the output of the waveform shaping circuit 12.

Figure 6:
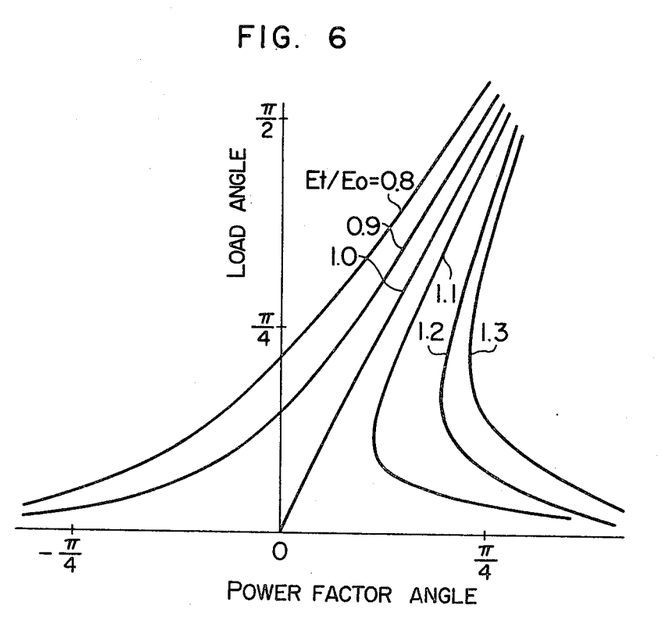
FIG. 6 shows in graphical representation the relationship between the power-factor angle and the load angle of the synchronous motor.

In view of the constant relationship between the power factor angle $\phi$ and the load angle $\delta$, the method of the present invention in which the gate control of the inverter is performed by detecting the armature current and controlling the power factor angle $\phi$, is equivalent to the conventional method in which the rotor position detector is used and the load angle $\delta$ is detected to control the thyristors constituting the inverter. FIG. 6 shows the relationship between the power factor angle $\phi$ and the load angle $\delta$. The power factor angle $\phi$ is positive when the phase of the armature current I lags that of the terminal voltage $E_t$ of the synchronous motor while the load angle $\delta$ is positive when the phase of the induced electromotive force $E_o$ lags that of the terminal voltage $E_t$. Accordingly, the operative region of the motor corresponds to the case where the load angle $\delta$ is such that $O \leq \delta \leq \pi$. As seen from FIG. 6, the relationship between the power factor angle and the load angle considerably changes when $E_t/E_o$ exceed the value of 1.0. Namely, the load angle $\delta$ increases with the power factor angle $\phi$ if $E_t/E_o$ is equal to or smaller than unity, but the load angle $\delta$ increases or decreases as the power factor angle $\phi$ increases if $E_t/E_o$ is greater than unity, that is, the load angle two values for a certain value of the power factor angle.

Figure 7:
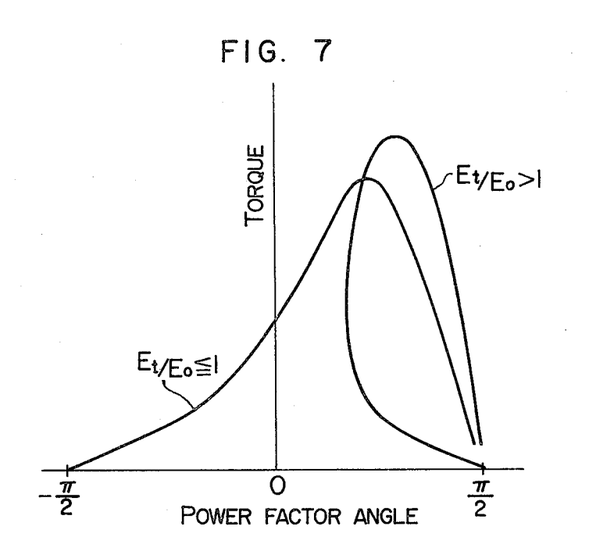
FIG. 7 shows in graphical representation the relationship between the power-factor angle and the torque of the synchronous motor.

The relationship between the power factor angle $\phi$ and the torque of the motor will be described with reference to FIG. 7. In FIG. 7, the torque is uniquely determined for a certain value of the power factor angle $\phi$ if the ratio $E_t/E_o$ of the terminal voltage $E_t$ to the induced electromotive force $E_o$ is equal to or smaller than unity but the torque is not uniquely determined for a certain value of the power factor angle if $E_t/E_o$ is greater than unity.

Figure 8:
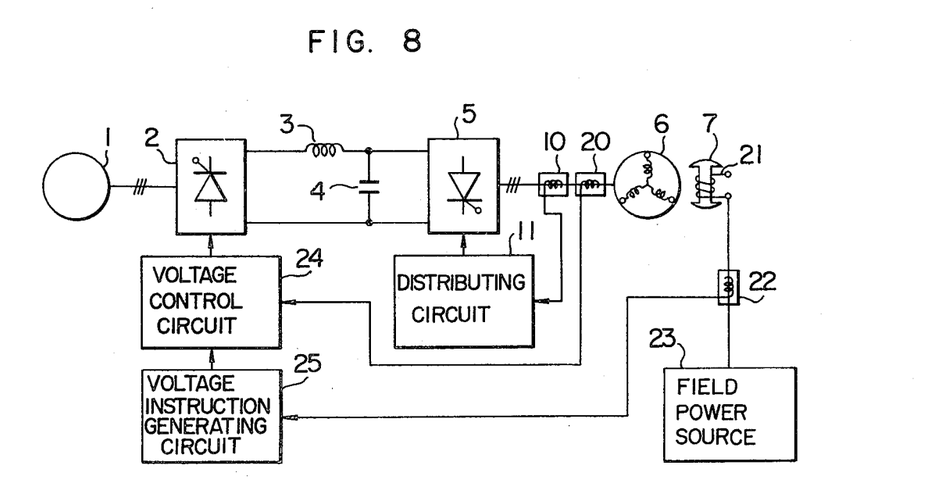
FIG. 8 shows a circuit for driving a synchronous motor, according to another embodiment of the present invention.

As described above, in the case of controlling the firing of the thyristors of a constant-voltage inverter by the signal obtained by detecting the armature current, it is necessary for stable operation that the ratio $E_t/E_o$ be equal to or smaller than unity. This requirement is satisfied by the embodiment of the present invention shown in FIG. 8. In FIG. 8, the same reference numerals are applied to like parts as in FIG. 3. The amplitude of the terminal voltage $E_t$ of a snychronous motor is determined by the amplitude of the dc voltage obtained by smoothing by the smoothing reactor 3 and the smoothing capacitor 4 the dc output voltage obtained by controlling the firing phases of the thyristors of the rectifying circuit 2. The amplitude of the induced electromotive force $E_o$ is determined by the amplitude of the field current. Accordingly, in order to control the terminal voltage of the synchronous motor in such a manner that $E_t/E_o \leq 1$, the field current supplied from a field power source 23 to a field winding 21 must first be detected by a field current detector 22. The output of the field current detector 22 is then applied to a voltage instruction generating circuit 25. The voltage instruction generating circuit 25 feeds a voltage control circuit 24 a voltage instruction signal whose amplitude is in proportion to that of the field current. The voltage control circuit 24 controls, on the basis of the signal ($E_t$) detected by a voltage detector 20 to detect the terminal voltage of the snychronous motor and the voltage instruction signal ($E_o$) of the voltage instruction generating circuit 25, the firing phases of the thyristors of the rectifying circuit 2 in such a manner that $E_t/E_o \leq 1$.

On the other hand, since the operating frequency of the snychronous motor is determined by the output frequency of the inverter 5, the output frequency of the inverter 5 can be controlled if the firing of the thyristors of the inverter 5 is controlled to follow a predetermined order, as shown in FIG. 3, in response to the gate signal obtained by a distributing circuit 11 on the basis of the output signal of the current detector 10. Namely, in the distributing circuit 11, the output of the reference signal generating circuit 14 which delivers the signal to cause the output pulse obtained by waveform-shaping the output current of the current detector 10 through the waveform shaping circuit 12 to be shifted by a predetermined phase difference, is a speed instruction signal. Accordingly, the reference signal generating circuit 14 should be such a circuit as to deliver a signal which causes the phase difference between the output pulse of the phase shifting circuit 13 and the output pulse of the waveform shaping circuit 12 to increase when the synchronous motor is accelerated but to decrease when the motor is decelerated. As a result, the power factor angle of the snychronous motor positively increases at the accelerartion of the motor but decreases at deceleration, so that the acceleration or deceleration of the synchronous motor can be smoothly performed. In order words, the armature current I lags in phase from the terminal voltage $E_t$ at the acceleration of the motor and at the deceleration the lag becomes small or the current I lead in phase the voltage $E_t$.

The controlled operation of the synchronous motor is stable in the region where $E_t/E_o \leq 1$ and the efficiency is maximum for te operating region where $E_t/E_o = 0.7 - 0.9$.

As described above, according to the present invention, the output frequency of the inverter can be controlled by controlling the firing of the thyristors of the inverter by the gate signal obtained on the basis of the phase of the current flowing into the motor and the rotor position detector necessary for the conventional system can be eliminated so that the size of the motor can be reduced by a space to be occupied by the detector.

Moreover, the operation of the motor at high stability and efficiency can be realized by controlling the terminal voltage $E_t$ and the induced electromotive force $E_o$ in such a manner that $E_t/E_o \leq 1$.

Figure 9:
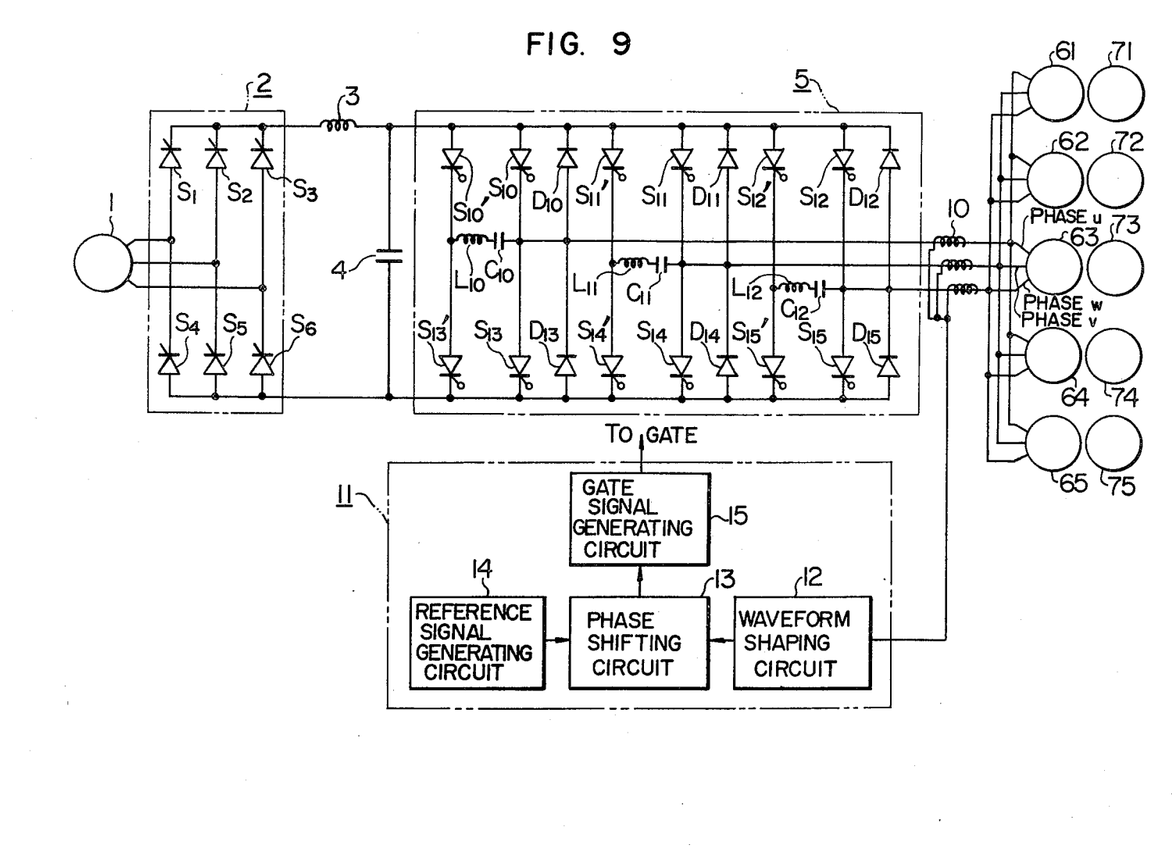
FIG. 9 shows a circuit for driving a plurality of synchronous motor, according to a further embodiment of the present invention.

FIG. 9 shows a further embodiment of the present invention which corresponds to a circuit in which a plurality of synchronous motors are operated by an inverter. In this figure the same parts as those of FIG. 3 are disignated by the same reference numbers and symbols. There is shown in FIG. 9 the inverter 5 connected to five synchronous motors which are constructed by stators 61, 62, 63, 64 and 65 and rotors 71, 72, 73, 74 and 75. These synchronous motors are connected to the current detector 10 through common connection lines and the gate signal of the inverter 5 derived from the distributing circuit 11 is controlled by the current phase detected in the current detector 10.

In such a construction, in even the case when one of those synchronous motors fails in synchronization, a stable operation is continued in each of the other remaining synchronous motors. In this case, these synchronous motors failing in synchronization are separated from the circuit by means of a breaker (not shown). That the stable operation of these other remaining synchronous motors is effected is because the inverter 5 is operated by detecting the phase of the current flowing through the common connection lines.

In this specification, the present invention is described as applied to an inverter but the same explanation can also be applied to the case where a cycloconverter to convert an ac power to another ac power is used.

What we claim is:

1. A method of controlling a synchronous motor, having a rotor and a stator, driven by a power converter of voltage source type having a gate signal supplied thereto, comprising the steps of detecting the position of the rotor with respect to the stator by detecting the phase of the current flowing into said motor with respect to the terminal voltage of said motor, and controlling the output frequency of said power converter by supplying a gate signal corresponding to the detected phase relationship of said current to said power converter.

2. A method as claimed in claim 1, wherein said phases of said currents lag or lead the phases of the terminal voltages of said motor, respectively, as said motor is accelerated or decelerated, the phase being detected and the gate signal provided in accordance with the detected phase.

3. A method as claimed in claim 1, further comprising the step of controlling said terminal voltage of said motor to always be lower tan the internal induced electromotive force of said motor.

4. An apparatus for controlling a synchronous motor, comprising an ac power source; a rectifying circuit to covert an ac current to a dc current; a phase converter of voltage sorce type, which receives the dc output of said rectifying circuit and delivers an output voltage having rectangular or staircase waveform; a synchronous motor having a stator and a rotor; current detectors to detect the position of the rotor with respect to the stator by detecting the phase of the current flowing from said power converter into said stator of said synchronous motor; and a distributing circuit to determine the phase of the output voltage of said power converter on the basis of the phase of the current obtained by said current detectors.

5. An apparatus as claimed in claim 4, wherein said distributing circuit includes a reference signal generating circuit to generate a speed instruction signal which causes the current of said motor to lag or lead in phase the terminal voltage of said motor, respectively, as said motor is accelerated or decelerated.

6. An apparatus as claimed in claim 4, further comprising a circuit to control the terminal voltage of said motor to always be lower than the internal induced electromotive force of said motor.

7. A method of controlling a plurality of synchronous motors, each having a rotor and a stator, driven by a power converter of voltage source type, comprising the steps of detecting the position of each rotor with respect to its corresponding stator by detecting the phase of a current common to the plurality of synchronous motors with respect to the terminal voltage of the plurality of synchronous motors and controlling the output frequency of said power converter by a gate signal corresponding to the phase of said current.

8. An apparatus for controlling a plurality of synchronous motors, comprising an ac power source; a rectifying circuit to convert an ac current to a dc one; a power converter of voltage source type, which receives the dc output of said rectifying circuit and delivers an output voltage having rectangular or staircase waveform; a plurality of synchronous motors each having a stator and a rotor; current detectors to detect the position of each rotor with respect to its corresponding stator by detecting the common phase of the current flowing from said power converter into said stator of said synchronous motors with respect to the terminal voltage of said synchronous motors; and a distributing circuit to determine the phase of the output voltage of said power converter on the basis of the phase of te current obtained by said current detectors.

9. An apparatus for controlling an electric motor, comprising an ac power source; a rectifying circuit to convert an ac current to a dc current; a power converter of voltage source type, which receives the dc output of said rectifying circuit and delivers an output voltage having rectangular or staircase waveform; a synchronous motor having a stator and a rotor; current detectors to detect the phase of the current flowing from said power converter into said stator of said synchronous motor; and a distributing circuit to determine the phase of the output voltage of said power converter on the basis of the phase of the current obtained by said current detectors; and further comprising a field current detector for detecting the field current of said motor; a voltage instruction generating circuit for generating a voltage corresponding to the induced electromotive force of the motor on the basis of the current detected by said field current detector; a voltage detector for detecting the terminal voltage; and a voltage control circuit for controlling said power converter so that the output voltage of said voltage detector is always less than that of said voltage instruction generating circuit.

* * * * *